INVENTORS
M. C. BURK
H. M. NEER, JR.

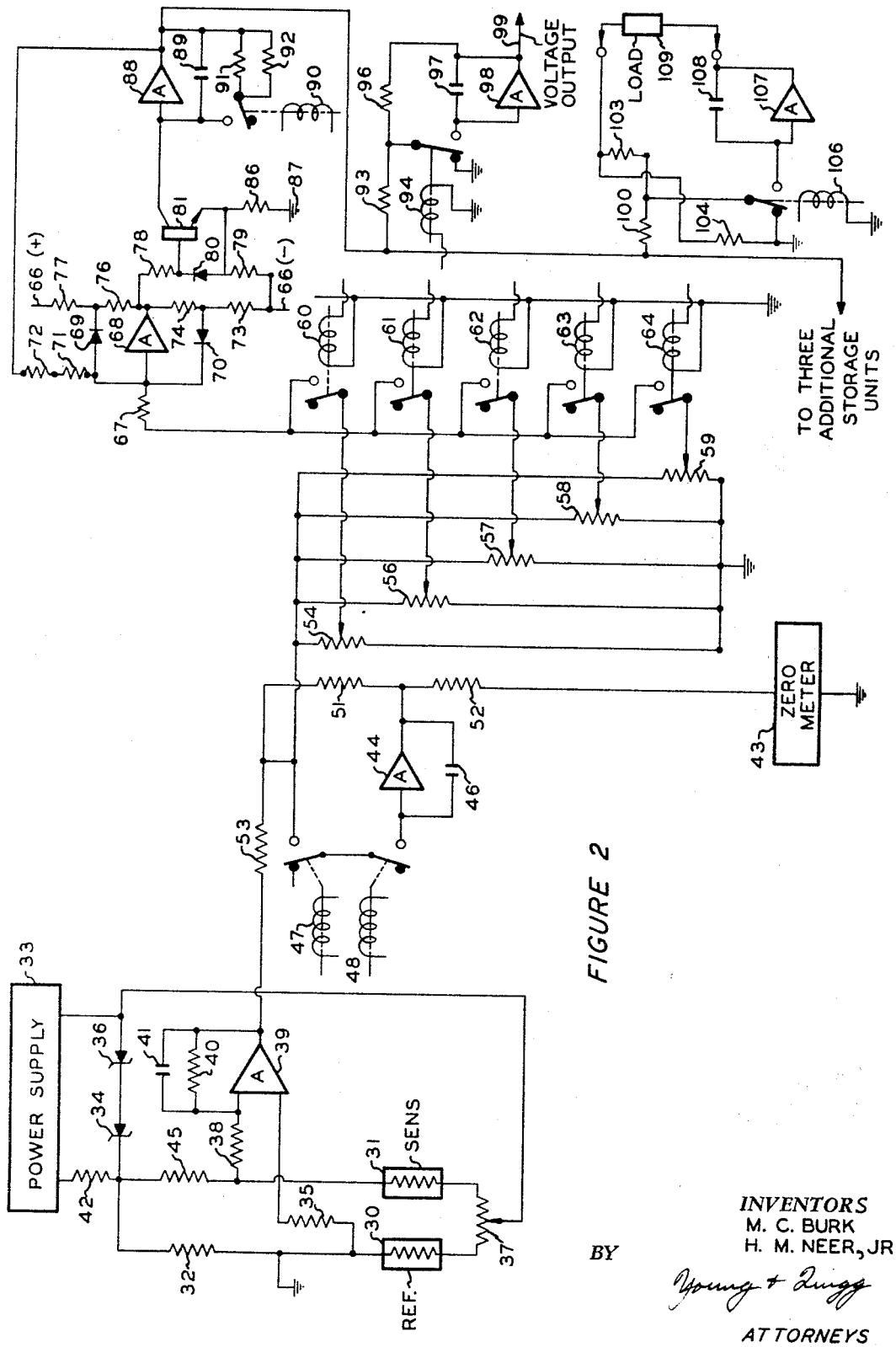

United States Patent Office 3,448,291
Patented June 3, 1969

3,448,291
CHROMATOGRAPHIC ANALYZER SIGNAL
HEIGHT READER AND STORAGE SYSTEM
Marvin C. Burk and Harold M. Neer, Jr., Bartlesville,
Okla., assignors to Phillips Petroleum Company, a corporation of Delaware
Filed May 24, 1965, Ser. No. 458,278
Int. Cl. H03k 5/20, 5/08, 15/18
U.S. Cl. 307—235                                7 Claims

ABSTRACT OF THE DISCLOSURE

The pulse output of a chromatographic bridge detector is zero-biased and attenuated and the resulting signals are applied to the input of a peak reader. The peak reader comprises first and second amplifiers with a transistor connected between the output of the first amplifier and the input of the second amplifier to provide polarity reversal and rectification. A resistance feedback circuit is connected between the output of the second amplifier and the input of the first amplifier. A capacitor is connected between the input and output of the second amplifier, and means for discharging the capacitor after each peak is associated therewith. Storage circuits are provided to store the output signal of the second amplifier.

---

Figure 1:
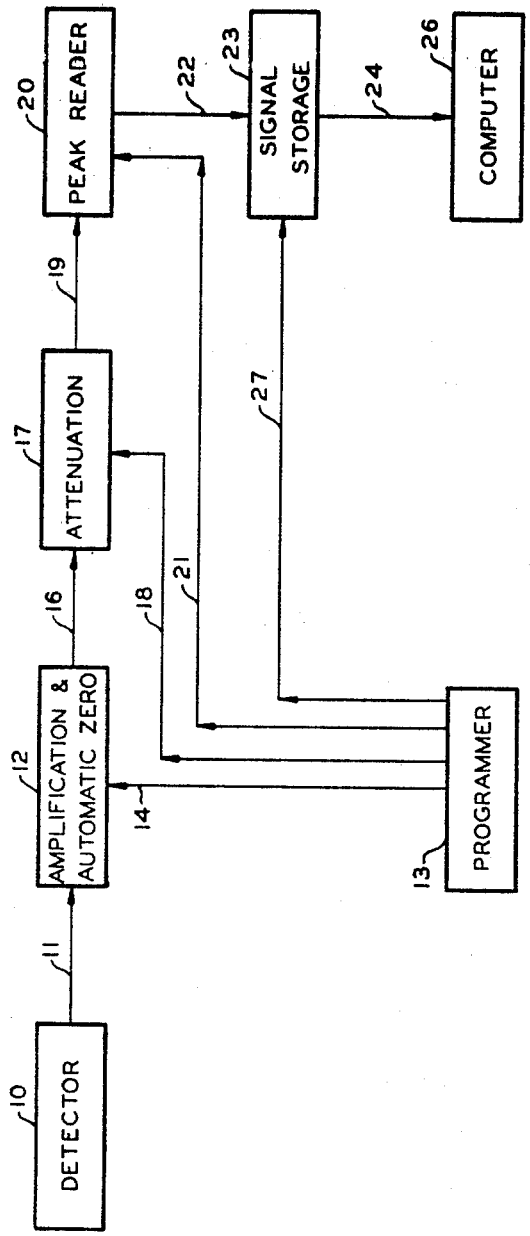

This invention relates to a method and apparatus for reading the heights of a pulsating chromatographic analyzer D.C. electrical signal and storing a signal representative of the signal peak heights.

A method of measuring the concentration of the constituents of fluids involves the use of a chromatographic analyzer. In chromatography, a sample of a fluid to be analyzed is introduced into a column containing a selective sorbent or partitioning material. A carrier gas is directed into the column so as to force the sample material therethrough. A selective sorbent, or partitioning material, attempts to hold the constituents of the mixture. This results in the several constituents of the fluid mixture flowing through the column at different rates of speed, depending upon their affinity for the packing material. The column effluent thus consists initially of the carrier gas alone, individual constituents of the fluid mixture appearing later at spaced time intervals.

A conventional method of detecting the presence and concentration of these constituents is to employ a thermal conductivity detector which compares the thermal conductivtiy of the effluent gas with the thermal conductivity of the carrier gas directed to the column. Such a detector provides signals representative of the difference in thermal conductivity between the column effluents and the carrier gas and the produced signals are conventionally recorded in the form of peaks.

The area beneath each peak is representative of the concentration of a constituent or group of constituents in the sample fluid. Thus, in order to determine the concentration of a constituent or group of constituents, it becomes necessary to institute conventional integration procedures for determining the area beneath the peak. These integration procedural steps require good peak separation and cannot advantageously be employed in many process control systems where rapid analysis of the process stream and rapid responsive manipulation of a process variable is required.

Accordingly, an object of our invention is to provide a chromatographic analyzer electrical DC pulsating signal peak height reading and storage system.

Another object of our invention is to provide an improved chromatographic analyzer data system utilizing a novel analog peak reader circuit.

Another object of our invention is to provide a chromatographic analyzer data system utilizing novel analog peak reader and data storage circuits.

Another object of our invention is to provide a chromatographic analyzer peak reader circuit.

Another object of our invention is to provide chromatographic analyzer peak reader and data storage circuits.

Other objects, advantages and features of our invention will be readily apparent to those skilled in the art from the following description, drawings and appended claims.

In the drawings, FIGURE 1 is a schematic representation of one embodiment of the invention, and FIGURE 2 illustrates the circuitry of the amplification, automatic zero, attenuation, peak reader, and signal storage circuit of FIGURE 1.

By our invention, we have provided a novel chromatographic analyzer peak reading or detecting and signal storage system applicable to reading the peak heights of pulsating DC electrical signals and storing signals representative of the chromatographic peak heights. The invention is particularly applicable, although not to be limited thereto, to positive pulsating chromatographic analyzer electrical DC signals pulsing from a minimum to a maximum height and returning to the minimum.

A better understanding of the invention can be obtained by referring to the drawings and the following description of a specific embodiment of the invention. It is not intended that the invention should be limited to the specific embodiments described herein.

Referring to FIGURE 1, a conventional chromatographic detector means 10 such as a thermistor or ionization detector transmits electrical signals representative of chromatographic peaks through a conduit means 11 to amplification and automatic zero means 12. Responsive to the signals received via conduit means 11 and control signals transmitted via conduit means 14 from a programmer 13, amplification and automatic zero means 12 transmits amplified electrical signals corrected or biased for zero off-set via conduit means 16 to attenuation means 17. The particular circuit within attenuation means 17 receiving a specific electrical signal from amplification and automatic zero means 12 via conduit means 16 is controlled by means of a control signal transmitted from programmer 13 via conduit means 18 to attenuation means 17. Although not to be limited thereto, programmer 13 can be timing apparatus such as described in U.S. Patent No. 3,119,995.

Attenuated signals are transmitted from attenuation means 17 via conduit means 19 to peak reader means 20. Peak reader means 20 is controlled by means of timing and reset signals transmitted from programmer 13 via conduit means 21. Peak reader means 20 produces and transmits signals representative of peak heights and constituent concentration via conduit means 22 to signal storage means 23, the particular signal storage circuit to receive the electrical signals selected by means of a control signal transmitted from programmer 13 via conduit means 27. As illustrated, signal storage means 23 transmits electrical signals representative of peak heights and constituent concentration via conduit means 24 to a computer 26. It is within the scope of this invention to transmit the signals from signal storage means 23 as set points to process controllers or other means for utilizing the stored signals.

For a more detailed description of the amplification and automatic zero means 12, attenuation means 17, peak reader means 20 and signal storage means 23, reference is made to FIGURE 2 and a specific embodiment hereinafter described.

The detector thermistors are connected in a bridge circuit. Four resistance elements are the reference and sample sensing thermistors 30 and 31, respectively, positioned in detector 10 and the 2–2,000 ohm resistors 32 and 45. A 50 ohm potentiometer 37 connected in series with the reference and sample thermistors 30 and 31 serves as a coarse zero adjustment.

The bridge power is supplied by a regulated power supply 33 with a special power transformer designed for good isolation between the output and the input lines. The voltage output from power supply 33 is further regulated against line voltage fluctuation by two series connected zener diodes 34 and 36. The voltage applied to the bridge is 18.6 D.C.

An electrical D.C. signal representative of the concentration of a fluid sample constituent is transmitted from thermistor 31 to amplifier 39. Amplifier 39 performs three functions: (1) it provides signal amplification with a voltage gain of 10, (2) presents a constant voltage resistance of 10,000 ohms via resistance means 38 to the thermal conductivity detector 10, and (3) reduces the response time of the hereinafter automatic zero circuit ten fold.

The 100K ohm resistor 40 is a feedback resistor around amplifier 39. The .15 mfd. capacitor 41 is connected in parallel with feedback resistor 40 and serves to reduce the amplifier noise by reducing the frequency response of the amplifier 39.

The function of the automatic zero circuit is to correct the signal received from amplifier 39 for zero off-set. This operation is programmed such that there are no sample components in the carrier gas passing the detector at the time it is in operation.

A D.C. signal representative of the concentration of a constituent of interest is passed from amplifier 39 to a hereinafter described attenuation circuit through a 100 ohm resistor 53. With the proper current through this resistor 53, the sum of the resistor voltage drop and the hereinafter zero offset voltage equals zero.

When the automatic zero circuit is programmed "on" responsive to a signal transmitted from programmer 13 via conduit means 14 to amplification and automatic zero means 12, both relays 47 and 48 are energized with the switches moved from the illustrated normally open position to the closed position. The signal applied to the attenuation circuit is also applied to the integrator consisting of the amplifier 44 and the 10 mfd. capacitor 46. The output of the integrator, by acting on the 10K resistor 51, causes a bias voltage to be applied through the 100 ohm resistor 53. If the signal level at the integrator input is not zero (meter 43 indicates amplifier 44 output, which is representative of the zero offset from amplifier 39 after the automatic zero has been turned on, and is thus an accurate indicator for adjusting the coarse zero), the integrator output will change until the bias current required to null the integrator input is reached. The null is approached as a first order lag with a ⅒ second time constant. A minimum of 1–2 seconds is allowed for making the automatic zero balance.

The output voltage range of amplifier 44 is ±10 volts which causes a voltage drop of ±100 millivolts across a 100 ohm resistor 53. Therefore, the range of the automatic zero, with reference to the detector output, is ±10 millivolts.

The voltage output of amplifier 44 is monitored by the zero meter 43. The meter as illustrated has a ±½ milliamp movement but a 20K series resistor 52 makes the full scale range ±10 volts.

The sensitivity of each signal pulse transmitted from detector 10 representative of the concentration of a constituent of interest must be programmed to (1) compensate for the detector's relative insensitivity to each constituent of the fluid sample, and (2) select a full scale range. These factors can be combined in a single potentiometer employed for the adjustment.

The signal transmitted from amplification and automatic zero means 12 via conduit means 16 is connected to one or more potentiometers in parallel within attenuation means 17. As illustrated in FIGURE 2, the potentiometers 54, 56, 57, 58 and 59 are employed. The output from the potentiometers 54, 56, 57, 58 and 59 is selected by relays 60, 61, 62, 63 and 64. Relays 60, 61, 62, 63 and 64 are energized one at a time responsive to a signal transmitted to attenuation means 17 via conduit means 18 from programmer 13.

An attenuated signal is transmitted via conduit means 19 to 10K ohm resistor 67 and amplifier 68. The voltage gain of the attenuated signal is 10 with transistor 81 employed between amplifier 68 and amplifier 88 to provide the correct phase for the feedback from amplifier 88. The feedback current for amplifier 68 is obtained from the output of amplifier 88 and passed via 1M ohm resistor 72 and 100K ohm resistor 71 to the input of amplifier 68.

Transistor 81 serves a second purpose in that it permits current flow to amplifier 88 in one direction only. If the input signal received from attenuation means 17 is increasing in the negative direction, the output from amplifier 68 is positive. This positive signal causes transistor 81 to conduct and the output of amplifier 88 moves in a positive direction. Feedback resistors 71 and 72 maintain a balance between the positive-going output and the negative-going input.

After a maximum voltage representative of a chromatographic peak height or process variable input has been reached, the input becomes less negative and the feedback from amplifier 88 remains constant. Therefore, the net input to amplifier 68 is positive and the amplifier 88 output is negative. A negative voltage applied to the base of transistor 81 prevents the flow of collector current and amplifier 88 holds constant at the maximum value—corresponding to the chromatographic peak height or constituent concentration. It should herein be noted that transistor 81 connections are reversed from normal to minimize the collector—to base leakage current. Transistor 81 is so connected that the normal emitter is used as the collector.

Diodes 69 and 70 connected to the input of amplifier 68 prevent amplifier saturation by providing a unit gain feedback path before the full scale output voltage is reached. Amplifier 88 is automatically reset to zero at the start of each constituent's signal. The reset is accomplished by energizing relay 90 via a signal transmitted from programmer 13 via conduit means 21 which discharges the 10 mfd. capacitor 89 through 2.5K resistors 91 and 92 connected in parallel.

The peak reading circuit as illustrated will respond only to negative input peaks (positive output peaks storage). However, the polarity may be reversed by replacing transistor 81 (an NPN type) with a PNP type.

Signal storage means 23 comprises means for providing continuous output signals available for use as inputs to recorders, controllers and process computers. A choice of voltage or current output signals is provided. As illustrated, the voltage output range is 0 to 10 volts and the current output range is 1 to 5 milliamperes or 4 to 20 milliamperes.

An output signal of amplifier 88 is transmitted via conduit means 22 to signal storage means 23. The storage element employed in signal storage means 23 is a conventional amplifier with provisions for initial condition input. The two 2.5K resistors 93 and 96 form a voltage summing network with the signals from amplifier 88 as one input and the voltage output from amplifier 98 as the other input. Energizing relay 94, by means of a signal transmitted via conduit means 27 from programmer 13 to signal storage means 23, causes the storage capacitor 97 to charge until the summing junction (amplifier 98 input) equals zero. When the null is reached, the output voltage 99 is equal to the negative of the input voltage. The null balance is approached as the first order lag with a 25 millisecond time constant (2.5K resistor 96 and 10 mfd. capacitor 97).

When the output of amplifier 88 is connected to a current operated apparatus such as a recorder or transducer, the signal is passed via 2.5K resistor 100 and 300 ohm resistor 103 to load 109. As connected, load 109 is employed as a feedback resistor. During the time of signal transfer from amplifier 88, as determined by a signal transmitted to relay 106 from programmer 13, the 10 mf. storage capacitor 108 is charged to the voltage necessary to give a current flow through load 109 equal to the input voltage divided by the input resistance (2.5K resistor 100). Thus, the null balance is made on the made on the basis of current through the load 109 so that the voltage across the load 109 is held constant at the corresponding value until the next signal transfer from amplifier 88.

As will be evident to those skilled in the art, various modifications of this invention can be made, or followed, in the light of the foregoing disclosure, without departing from the spirit or scope thereof.

We claim:

1. Apparatus comprising first amplifying means for sequentially amplifying each peak of a pulsating D.C. electrical signal, means for transmitting a pulsating D.C. electrical signal representative of the composition of a fluid mixture to said first amplifying means, means for sequentially attenuating each peak of a pulsating D.C. electrical signal, means for transmitting the resulting amplified D.C. electrical signal from said first amplifying means to said means for attenuating, a second amplifying means having an input connected to receive a pulsating D.C. electrical signal transmitted from said attenuating means, means for reversing the polarity of a pulsating D.C. electrical signal while passing current in only one direction, means for transmitting an amplified D.C. electrical signal from said second amplifying means to said means for reversing the polarity, a third amplifying means adapted to sequentially transmit from the output thereof a D.C. electrical signal of substantially constant voltage representative of the maximum voltage of each of said attenuated peaks, means for transmitting a D.C. electrical signal of reverse polarity from said means for reversing the polarity to said third amplifying means, and means connected to said output of said third amplifying means for applying a feedback signal proportional to said constant voltage to said input of said second amplifying means, said feedback signals having a polarity opposite that of said pulsating D.C. electrical signal transmitted from said attenuation means.

2. The apparatus of claim 1 further including means for storing said D.C. electrical signal of substantially constant voltage.

3. Apparatus comprising a first polarity reversing amplifying means having an input and an output, means for applying to said input of said first polarity reversing amplifying means input pulses having a first polarity, a second polarity reversing amplifying means having an input and an output, polarity reversing means connected between said output of said first polarity reversing amplifying means and said input of said second polarity reversing amplifying means, means for biasing said input of said polarity reversing means to cause said polarity reversing means to produce output pulses responsive only to input pulses of a second polarity opposite to said first polarity, at least one capacitor connected between said input of said second polarity reversing amplifying means and said output of said second polarity reversing amplifying means, resistive feedback means connected between said output of said second polarity reversing amplifying means and said input of said first polarity reversing amplifying means for applying a voltage of said second polarity to said input of said first polarity reversing amplifying means so that while each of said input pulses is increasing in the direction of said first polarity the net input to said first polarity reversing amplifying means has said first polarity and when each of said input pulses reaches a maximum in the direction of said first polarity and starts decreasing the net input to said first polarity reversing means has said second polarity, means for discharging said capacitor at selected times, whereby the voltage at said output of said second amplifying means is representative of the highest voltage of said series of pulses of a first polarity occurring since the last time said capacitor was discharged.

4. Apparatus in accordance with claim 3 further comprising means for storing said voltage at said output of said second polarity reversing amplifying means.

5. Apparatus in accordance with claim 4 wherein said polarity reversing means is a transistor.

6. Apparatus in accordance with claim 5 wherein the base of said transistor is connected to said output of said first polarity reversing amplifying means, the collector of said transistor is connected to said input of said second polarity reversing amplifying means, and the emitter of said transistor is connected to a source of D.C. voltage.

7. Apparatus in accordance with claim 5 further comprising a first rectifier and a first resistor connected in series between said output of said first polarity reversing amplifying means and said input of said first polarity reversing amplifying means, and a second resistor and a second rectifier connected in series between said output of said first polarity reversing amplifying means and said input of said first polarity reversing amplifying means, said first and second rectifiers being connected in opposite directions.

References Cited

UNITED STATES PATENTS

| | | | |
|---|---|---|---|
| 2,917,626 | 12/1959 | Usher | 328—127 |
| 2,983,880 | 5/1961 | McFadden | 328—127 XR |
| 3,229,212 | 1/1966 | Rogers | 328—128 XR |
| 3,094,862 | 6/1963 | Burk | 328—151 XR |
| 3,278,851 | 10/1966 | Damon | 307—88.5 XR |

ARTHUR GAUSS, *Primary Examiner.*

JOHN ZAZWORSKY, *Assistant Examiner.*

U.S. Cl. X.R.

73—23.1; 307—237, 238; 328—151, 127